(12) United States Patent
Kenworthy

(10) Patent No.: US 6,344,076 B1
(45) Date of Patent: Feb. 5, 2002

(54) MONOAZO DYES AND INKS CONTAINING THEM

(75) Inventor: Mark Kenworthy, Blackley (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 09/446,972

(22) PCT Filed: Jun. 24, 1998

(86) PCT No.: PCT/GB98/01853

§ 371 Date: Dec. 30, 1999

§ 102(e) Date: Dec. 30, 1999

(87) PCT Pub. No.: WO99/01510

PCT Pub. Date: Jan. 14, 1999

(30) Foreign Application Priority Data

Jan. 11, 1997 (GB) .............................................. 9723007
Mar. 7, 1997 (GB) .............................................. 9714010

(51) Int. Cl.[7] ....................... C09D 11/02; C09B 62/245; C09B 43/16; D06P 5/00
(52) U.S. Cl. ..................... 106/31.48; 534/803; 427/466; 428/195
(58) Field of Search ...................... 106/31.48; 534/803; 427/466; 428/195

(56) References Cited

U.S. PATENT DOCUMENTS

| | | | | |
|---|---|---|---|---|
| 4,771,129 A | * | 9/1988 | Kawashita et al. | 534/803 |
| 5,118,737 A | * | 6/1992 | Baxter et al. | 106/31.48 |
| 5,599,386 A | * | 2/1997 | Sano et al. | 106/31.48 |
| 5,772,745 A | * | 6/1998 | Gregory et al. | 106/31.48 |
| 5,824,785 A | * | 10/1998 | Baettig et al. | 106/31.48 |

FOREIGN PATENT DOCUMENTS

| | | |
|---|---|---|
| DE | 2 062 163 | 6/1971 |
| EP | 481 449 A2 | 4/1992 |
| EP | 559 310 A1 | 9/1993 |
| GB | 2 17 17 14 A | 9/1986 |

* cited by examiner

Primary Examiner—Helene Klemanski
(74) Attorney, Agent, or Firm—Pillsbury Winthrop LLP

(57) ABSTRACT

The invention relates to a compound of Formula (1) and to an ink jet printing process using inks; a substrate printed with the inks and cartridges all which comprise the compound of Formula (1) wherein A is N, C—Cl, C—CN or C—NO$_2$; L$^1$ Is —OR$^3$, Z is —O—, —S— or —NR$^2$—; R$^1$ and R$^2$ are each independently H or optionally substituted alkyl; R$^3$ is H or alkyl; each W independently is —CO$_2$Q or —SO$_3$Q; each X independently is an optionally substituted amino group or a group which is substituted by an optionally substituted amino group; each Y independently is halo, hydroxy, nitro, cyano, optionally substituted alkyl optionally substituted alkoxy, optionally substituted aryl, optionally substituted aralkyl, —SR$^a$—COR$^a$, —COOR$^a$, —SO$_3$R$^a$ or —SOR$^a$; R$^a$ is C$_{1-4}$-alkyl optionally substituted by carboxy, sulpho, hydroxy, nitro, cyano or halo: each Q independently is ammonium or substituted ammonium; m, n and p each independently have a value of from 0 to 3; and (m+n+p) has a value of from 0 to 5.

Formula (1)

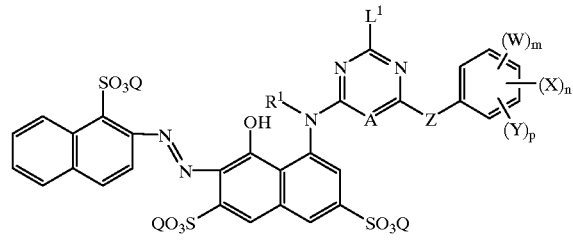

11 Claims, No Drawings

MONOAZO DYES AND INKS CONTAINING THEM

This application is the national phase of international application PCT/GB98/01853 filed Jun. 24, 1998 which designated the U.S.

This invention relates to dyes, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According a first aspect of the present invention there is provided a compound of Formula (1):

Formula (1)

wherein:

A is N, C—Cl, C—CN or C—NO$_2$;

L$^1$ is —OR$^3$;

Z is —O—, —S— or —NR$^2$—;

R$^1$ and R$^2$ are each independently H or optionally substituted alkyl;

R$^3$ is H or alkyl;

each W independently is —CO$_2$Q or —SO$_3$Q;

each X independently is an optionally substituted amino group or a group which is substituted by an optionally substituted amino group;

each Y independently is a substituent other than those defined for W and X;

each Q independently is ammonium or substituted ammonium;

m, n and p each independently have a value of from 0 to 3; and (m+n+p) has a value of from 0 to 5.

Preferably A is N.

Preferably m, n and p each independently have a value of 0 or 1.

Preferably n is 1 when m is 0

Preferably (m+n+p) has a value of 1, 2 or 3, more preferably 1 or 2.

Z is preferably —NR$^2$—, more preferably —NH—.

Preferably each Y independently is halo, more preferably F or Cl; hydroxy; nitro; cyano; optionally substituted alkyl, preferably optionally substituted C$_{1-10}$-alkyl, especially C$_{1-4}$-alkyl; optionally substituted alkoxy, preferably optionally substituted C$_{1-10}$-alkoxy, more preferably C$_{1-4}$-alkoxy; optionally substituted aryl, preferably optionally substituted phenyl or optionally substituted naphthyl; optionally substituted aralkyl, preferably optionally substituted C$_{7-12}$-aralkyl, more preferably phenyl-(C$_{1-6}$-alkylene)-, especially phenyl-—CH$_2$—; —SR$^a$; —COR$^a$; —COOR$^a$; SO$_3$R$^a$; —SO$_2$R$^a$; or —SOR$^a$; wherein R$^a$ is optionally substituted C$_{1-4}$-alkyl; wherein the optional substituents are selected from carboxy, sulpho, hydroxy, nitro, cyano and halo.

R$^1$ and R$^2$ are preferably each independently H or optionally substituted C$_{1-4}$-alkyl, more preferably H, C$_{1-4}$-alkyl or C$_{2-4}$-alkyl substituted by hydroxy, carboxy, sulpho or cyano. Examples include methyl, ethyl, n-propyl, iso-propyl, hydroxyethyl, cyanoethyl, sulphopropyl and carboxyethyl. It is especially preferred that R$^1$ and R$^2$ are H.

Preferably the compounds of Formula (1) are monoazo compounds (i.e. they contain only one azo (—N═N—) group).

R$^3$ is preferably H or C$_{1-10}$-alkyl, more preferably H or C$_{1-6}$alkyl, especially H or C$_{1-4}$-alkyl, more especially H.

When X is, or is substituted by, an optionally substituted amino group, the optionally substituted amino group preferably has a pK$_a$ of from 12 to 4, more preferably of from 10 to 6.

The optionally substituted amino groups referred to in the definition of X are preferably of the formula —NR$^4$R$^5$ wherein R$^4$ and R$^5$ are each independently H or optionally substituted alkyl; or R$^4$ and R$^5$ together with the nitrogen atom to which they are attached form a 5- or 6-membered ring.

When R$^4$ or R$^5$ is optionally substituted alkyl it is preferably optionally substituted C$_{1-6}$-alkyl, more preferably optionally substituted C$_{1-4}$-alkyl. Preferred substituents are selected from carboxy, sulpho, hydroxy, amino and C$_{1-4}$-alkoxy.

When R$^4$ and R$^5$ together with the nitrogen to which they are attached form an optionally substituted 5- or 6-membered ring they preferably form optionally substituted morpholine, more preferably optionally substituted piperazine. The substituents are preferably selected from hydroxy, carboxy, sulpho, C$_{1-6}$-alkoxy, C$_{1-6}$-alkyl and C$_{1-6}$-alkyl substituted by hydroxy, carboxy, sulpho or an optionally substituted amino group.

A preferred substituted morpholine or piperazine ring carries a group of the formula —M—NR$^6$R$^7$ wherein M is an alkylene linking group and R$^6$ and R$^7$ are each independently H, C$_{1-6}$-alkyl or C$_{1-6}$-alkyl substituted by hydroxy, carboxy, sulpho, amino or C$_{1-4}$-alkoxy.

M is preferably C$_{1-6}$-alkylene, more preferably C$_{2-6}$-alkylene and especially —(CH$_2$)$_g$—, where g is from 2 to 6.

An especially preferred substituted piperazinyl group is of the Formula (2):

Formula (2)

wherein M, R$^6$ and R$^7$ are as hereinbefore defined.

Preferred groups of the Formula (2) include

—N(piperazine)N—(C$_{1-6}$-alkylene)NH$_2$ and

—N(piperazine)N—(C$_{1-6}$-alkylene)NH(C$_{1-6}$-alkyl)

Examples of optionally substituted amino groups include:
—NH$_2$, —NHCH$_2$CH$_3$, —N(CH$_2$CH$_3$)$_2$, —NHCH$_2$CH$_2$OH:
—NH(CH$_2$)$_2$N(CH$_3$)$_2$, —NH(CH$_2$)$_2$N(CH$_3$)$_2$, —NH(CH$_2$)$_2$—N(piperazine)NH, —NH(CH$_2$)$_2$—N(morpholine)O, —NH(CH$_2$)$_3$—N(morpholine)O, —NH(CH$_2$)$_3$—N(piperazine)N—(CH$_2$)$_3$NH$_2$ When X is a group which is substituted by an optionally substituted amino group it preferably comprises optionally interrupted alkylene carrying a —NR$^4$R$^5$ group wherein R$^4$ and R$^5$ are as hereinbefore defined.

Preferably the optionally interrupted alkylene group comprise one, two or three C$_{2-10}$-alkylene chains and 0, 1, 2, 3 or 4 interrupting groups selected from O, CO, CO$_2$, S, SO, SO$_2$, NH, optionally substituted phenylene, CONH and SO$_2$NH. The interrupting groups may link each of the C$_{2-10}$-alkylene chains and/or be at a terminal position in the interrupted alkylene chain.

Preferred interrupted alkylene groups having one C$_{2-10}$-alkylene chain and one interrupting group are of the formula —SO$_2$NH—(C$_{2-10}$-alkylene)-; —NHSO$_2$(C$_{2-10}$-alkylene)—; —CONH—(C$_{2-10}$-alkylene)—; —NHCO—(C$_{2-10}$-alkylene)—; —[(O, S or NH)—C$_{2-10}$-alkylene]—; —SO—(C$_{2-10}$-alkylene)—; and SO$_2$—(C$_{2-10}$-alkylene)—.

Preferred interrupted alkylene groups having two C$_{2-10}$-alkylene chains and two interrupting groups are any two of the groups described in the previous paragraph attached together, especially —SO$_2$—(C$_{2-10}$-alkylene)—NH—(C$_{2-10}$-alkylene)—.

Q is preferably of the formula $^+$NT$_4$ wherein each T independently is H or optionally substituted alkyl, or two groups represented by T are H or optionally substituted alkyl and the remaining two groups represented by T, together with the N atom to which they are attached, form a 5- or 6-membered ring (preferably a morpholine, pyridine or piperidine ring).

Preferably each T independently is H or C$_{1-4}$-alkyl, more preferably H, CH$_3$ or CH$_3$CH$_2$, especially H. Thus Q is preferably ammonium (i.e. $^+$NH$_4$).

Examples of groups represented by Q include $^+$NH$_4$, morpholinium, piperidinium, pyridinium, (CH$_3$)$_3$N$^+$H, (CH$_3$)$_2$N$^+$H$_2$, H$_2$N$^+$(CH$_3$)(CH$_2$CH$_3$),CH$_3$N$^+$H$_3$, CH$_3$CH$_2$N$^+$H$_3$, H$_2$N$^+$(CH$_2$CH$_3$)$_2$, CH$_3$CH$_2$CH$_2$N$^+$H3, CH$_3$CH$_2$CH$_2$N$^+$H$_3$, (CH$_3$)$_2$CHN$^+$H$_3$, N$^+$(CH$_3$)$_4$, N$^+$(CH$_2$CH$_3$)$_4$, N-methyl pyridinium, N,N-dimethyl piperidinium and N,N-dimethyl morpholinium.

A first preferred embodiment of the present invention comprises a compound of the Formula (1) and salts thereof wherein:

A is N;
m is 0, 1 or 2;
n is 0 or 1;
p is 0 or 1;
X is of the formula —NR$^4$R$^5$ or a group which is substituted by —NR$^4$R$^5$;
Y is halo, hydroxy, cyano, C$_{1-4}$-alkyl, C$_{1-4}$-alkoxy, —SR$^a$, —COR$^a$, —COOR$^a$, —SO$_3$R$^a$, —SO$_2$R$^a$ or SOR$^a$; and
R$^1$, R$^2$, R$^3$, R$^4$, R$^5$, R$^a$, Q and W are as hereinbefore defined.

In the first preferred embodiment it is especially preferred that Y is C$_{1-4}$-alkyl.

A second preferred embodiment comprises a monoazo compound of the Formula (3):

Formula (3)

[Structure of Formula (3)]

wherein:
Z is —O—, —S— or —NR$^8$—;
R$^8$ is H or C$_{1-4}$-alkyl optionally substituted by hydroxy, carboxy, sulpho or cyano;
L$^2$ is —OR$^9$;
R$^9$ is H or C$_{1-4}$-alkyl;
each W independently is —CO$_2$Q or —SO$_3$Q;
each X$^1$ is —NR$^4$R$^5$, —SO$_2$—NR$^4$R$^5$, —SO$_2$(C$_{1-10}$-alkylene)—NR$^4$R$^5$ or C$_{1-6}$-alkyl substituted by —NR$^4$R$^5$;
each Y$^1$ independently is Cl, nitro, cyano, C$_{1-10}$-alkyl, or C$_{1-10}$-alkyl substituted by hydroxy, carboxy, sulpho, or C$_{1-6}$-alkoxy;
m, n and p are each independently 0 or 1;
(m+n+p) is 1, 2 or 3; and
Q, R$^4$ and R$^5$ are as hereinbefore defined;
provided that n is 1 when m is 0.

In preferred compounds of Formula (3) R$^4$ and R$^5$ are each independently H or optionally substituted C$_{1-6}$-alkyl as hereinbefore described, or —NR$^4$R$^5$ is of Formula (2) as hereinbefore defined.

Preferred compounds in the second embodiment comprise a compound of Formula (3) as hereinbefore defined wherein:
Z is —NR$^8$—;
Y$^1$ is C$_{1-6}$-alkyl;
L$^2$ is —OH or methoxy; and
R$^8$, W, X$^1$, m, n, p, R$^4$ and R$^5$ are as hereinbefore defined, provided that n is 1 when m is 0.

The compounds of Formula (1) and (3) may be made from corresponding compounds in the free acid or alkali metal salt form using techniques known in the art. For example, an alkali metal salt of a dye may be converted into a salt with ammonia or an amine by dissolving an alkali metal salt of the dye in water, acidifying with a mineral acid and adjusting the pH of the solution to pH 9 to 9.5 with ammonia or the amine and removing the alkali metal cations by dialysis.

The compounds may be prepared in the free acid or salt form using conventional techniques for the preparation of azo dyes. For example a suitable method comprises condensing a compound of the Formula (4) with a compound of the Formula L¹H:

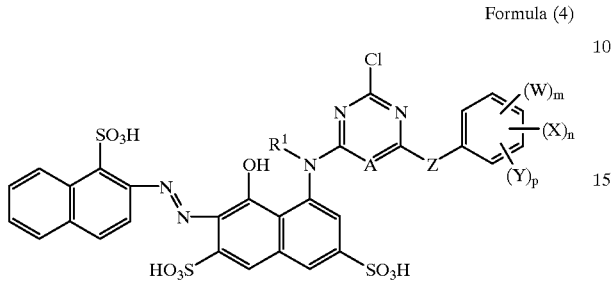

Formula (4)

wherein:

R¹, Z, A, W, X, Y, m, n, p are as hereinbefore defined.

The condensation is preferably performed in a liquid medium, more preferably an aqueous medium and especially water. Temperatures of 15° C. to 100° C. are preferred, more preferably from 60 to 90° C. Preferably a reaction time of 1 to 48, more preferably 3 to 24 hours is used.

The condensation is preferably performed in the presence of a base. The base may be any inorganic base for example, ammonia, an alkali metal or alkali earth metal hydroxide, carbonate or bicarbonate, or an organic base. Preferred organic bases are tertiary amines for example, N-alkylated heterocycles, for example N—($C_{1-4}$alkyl)morpholine, N—($C_{1-4}$-alkyl)piperidine, N,N'-di($C_{1-4}$-alkyl)piperazine; tri($C_{1-4}$-alkyl)amines, for example triethylamine, and optionally substituted pyridines, especially pyridine.

The amount of base used may be varied between wide limits but it is preferred to use less than 40, more preferably less than 10 and especially from 3 to 5 moles for each mole of the compound of Formula (4).

After the condensation the product may be isolated by precipitating the product as a salt from the reaction mixture for example by the addition of a suitable alkali metal salt, especially sodium chloride. Alternatively, the product may be isolated in its free acid form by acidifying the reaction mixture, preferably using a mineral acid, especially hydrochloric acid. Where the product precipitates as a solid it may be separated from the mixture by filtration.

If desired unwanted anions may be removed from the product of the above process by dialysis, osmosis, ultrafiltration or a combination thereof.

The product of the above process may be converted to the ammonium or substituted ammonium salt by the addition of ammonia, ammonium hydroxide, primary, secondary, tertiary or quaternary amine. When the base used in the condensation process is an organic amine an excess may be used so that the compound of Formula (1) is formed as the substituted ammonium salt.

The compound of the Formula (4) may be prepared using conventional techniques, for example by:
(1) diazotising 2-naphthylamine-1-sulphonic acid to give the corresponding diazonium salt;
(2) coupling the diazonium salt from stage (1) with 1-acetamido-8-naphthol-3,6-disulphonic acid at a pH>7, preferably at a pH of from 8 to 9;
(3) alkaline hydrolysis of the product of stage (2) to remove the acetyl group;
(4) condensing the product from stage (1) with a compound of the formula:

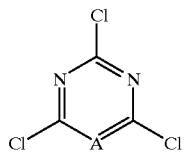

wherein A is as hereinbefore defined; and
(5) condensing the product from stage (4) with approximately 1 molar equivalent of the compound of the formula:

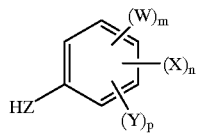

wherein Z, W, X, Y, m, n and p are as hereinbefore defined.

The diazotisation in stage (1) is preferably performed in an aqueous medium at a pH below 7 in the presence of a suitable diazotisation agent. Dilute mineral acid, e.g. HCl or $H_2SO_4$, is preferably used to achieve the desired acidic conditions. Conveniently the diazotisation agent is formed in-situ, for example by dissolving an alkali metal nitrite, preferably sodium nitrite, in a molar excess of mineral acid, preferably HCl. Normally at least one mole of diazotisation agent per mole of 2-naphthylamine-1-sulphonic acid, preferably from 1 to 1.25 moles will be used in the diazotisation.

The temperature of the diazotisation is not critical and may conveniently be carried out at from −5° C. to 20° C., preferably from 0 to 10° C. and especially from 0 to 5° C.

The hydrolysis in stage (3) is preferably performed at a pH in the range 9 to 14. The temperature during hydrolysis is preferably from 40 to 90° C.

According to a second aspect of the present invention there is provided an ink comprising:
(a) from 0.01 to 30 parts of a compound of the Formula (1), or preferably of Formula (3), as hereinbefore defined except that Q is any cation; and
(b) from 70 to 99.99 parts of a medium comprising component (i), (ii) or (iii):
 (i) a mixture of water and an organic solvent;
 (ii) an organic solvent free from water; or
 (iii) a low melting point solid;
wherein all parts are by weight and the number of parts of (a)+(b)=100.

In preferred compounds which may be used in the component (a) of the ink Q is H or an alkali metal, more preferably Q is sodium, ammonium or substituted ammonium. It is especially preferred that Q is ammonium or substituted ammonium as hereinbefore defined in the first aspect of the present invention.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a mixture of water and an organic solvent or an organic solvent free from water, preferably component (a) is completely dissolved in component (b). Preferably component (a) has a solubility in component (b) at 20° C. of at least 10%. This allows the preparation of concentrates which may be used to prepare more dilute inks and reduces the chance of the dye precipitating if evaporation of the liquid medium occurs during storage.

When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy) ethoxy]ethanol, 2-[2-(2-ethoxyethoxy)-ethoxy]-ethanol and ethyleneglycol monoallylether, cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono- $C_{1-4}$-alkyl ethers of diols having 2 to 12 carbon atoms, especially 2-methoxy-2-ethoxy-2-ethoxyethanol.

A preferred medium comprises:
a) from 75 to 95 parts water; and
b) from 25 to 5 parts in total of one or more solvents selected from diethylene glycol, 2-pyrrolidone, thiodiglycol, N-methylpyrrolidone, cyclohexanol, caprolactone, caprolactam and pentane-1,5-diol;

wherein the parts are by weight and the sum of the parts (a) and (b)=100.

Examples of further suitable ink media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass Preferred low melting solid media have a melting point in the range from 60° C. to 125° C. Suitable low melting point solids include long chain fatty acids or alcohols, preferably those with $C_{18-24}$ chains, and sulphonamides. The dye of Formula (1) or (3) may be dissolved in the low melting point solid or may be finely dispersed in it.

The dyes according to the present invention exhibit a high solubility in aqueous media, accordingly it is preferred that the liquid medium is a mixture of water and one or more water miscible organic solvent(s).

The ink may also contain additional components conventionally used in ink jet printing inks, for example viscosity and surface tension modifiers, pH buffers (e.g. 1:9 citric acid/sodium citrate) corrosion inhibitors, biocides, kogation reducing additives and surfactants which may be ionic or non-ionic.

The presence of impurities in an ink jet printing ink can result in the formation of precipitates in the ink This is undesirable because the precipitates can block the narrow ink jet nozzle in the printer. Therefore, the dye(s) according to the present invention may be, and preferably are, purified to remove undesirable impurities before they are incorporated into inks for ink jet printing. Conventional techniques may be employed for purifying the dyes, for example osmosis and/or dialysis.

A third aspect of the present invention provides a process for printing an image on a substrate comprising applying an ink according to the second aspect of the present invention to the substrate by means of an ink jet printer.

Preferred inks used in this process contain a dye of the Formula (1) or Formula (3) are as defined in the first aspect of the present invention.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character. Examples of commercially available papers include, HP Premium Coated Paper, HP Photopaper (all available from Hewlett Packard Inc), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper, Xerox Acid Paper (available from Xerox).

A fourth aspect of the present invention provides a paper, an overhead projector slide or a textile material printed with an ink according to the second aspect of the present invention, or by means of the process according to the third aspect of the present invention.

When the substrate is a textile material the ink according to the invention is preferably applied thereto by:
  i) applying the ink to the textile material using an ink jet printer; and
  ii) heating the printed textile material at a temperature of from 50° C. to 250° C.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferably the textile material has been treated with an aqueous pre-treatment composition comprising a thickening agent and optionally a water-soluble base and a hydrotropic agent and dried prior to step i) above.

The pre-treatment composition preferably comprises a solution of the base and the hydrotropic agent in water containing the thickening agent. Particularly preferred pre-treatment compositions are described more fully in European Patent Application No.534660A1.

A fifth aspect of the present invention provides an ink jet printer cartridge containing an ink according to the second aspect of the present invention. The ink jet printer cartridge is optionally refillable.

The invention is further illustrated by the following Examples in which all parts and percentages are by weight unless otherwise stated.

EXAMPLE 1

Dye

Dye (1) was prepared using the method described below:

Dye (1)

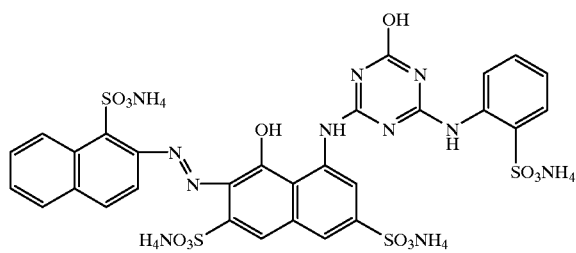

Stage (i)

2-Naphthylamine-1-sulphonic acid (0.304M, 67.84 g at 100%) was added to water (500 ml) and cooled to 0–5° C. Concentrated HCl (150 ml) was then added followed by 2N NaNO$_2$ (150 ml). The solution was stirred for 1 hour at 0–5° C. and excess NaNO$_2$ was destroyed by addition of sulphamic acid.

To the above solution was added 1-acetamido-8-naphthol-3,6-disulphonic acid (0.304M, 109.83 g at 100%) in water (500 ml). The pH was then raised to 7.0 by addition of a concentrated solution of NaOH and the solution was stirred for 3 hours at 0–5° C. The solution was then adjusted to 1.5M NaOH by addition of NaOH pellets and was heated to 85° C. for 6 hours The pH was then reduced to 7.0 by addition of concentrated HCl and the solution was salted to 20% with NaCl. The resulting precipitate was filtered off, washed and dried. Strength estimated at 71.6%.

Stage (ii)

The product of stage (i) above (86.5 g, 0.1 mole at 71.6% strength) was dissolved in water (800 ml). Cyanuric chloride (19.36 g, 0.105 mole) was dissolved in acetone (200 ml) and added to ice/water (300 g). To this was added the solution of the product of stage (i) allowing the pH to fall. The resulting solution was stirred for 2 hours at 0–5° C. The pH was then raised to 7.0 by addition 2N NaOH solution and the solution was allowed to self-warm to room temperature.

2-Aminobenzenesulphonic acid (0.11 mole, 19.05 g) was added to the solution and the pH was maintained at 7 by addition 2N NaOH. The reaction mixture was stirred to 6 hours at room temperature. The solution was then salted to 20% with NaCl. The resulting precipitate was filtered off, washed and dried.

The product of stage (2) was of the formula:

Stage (iii)

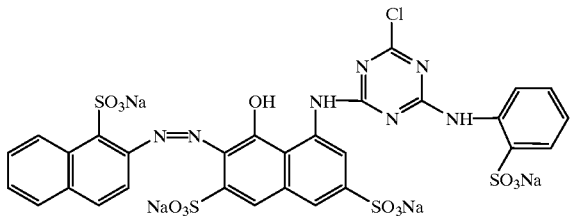

Stage (iii)

The product of stage (ii) above (33 g, 0.025 mole at 70% strength) was dissolved in water (300 ml) and the pH adjusted to 12.0 by addition of NaOH. The solution wets heated to 90° C. for 8 hours maintaining pH at 12.0 by addition of 2N NaOH. The pH was then lowered to 7.0 by addition of concentrated HCl and was cooled to room temperature. The solution was salted to 20% w/w with NaCl and the resulting precipitated isolated lay filtration.

The solid was purified by dialysis. Finally the purified compound was converted to the ammonium salt by ion exchange solution to give the title product.

Ink

Ink (1) was prepared by dissolving 2 parts of Dye (1) in 98 parts of a mixture comprising 90 parts water and 10 parts 2-pyrrolidone. The pH of the ink was 7.0.

Ink Jet Printing

Ink 1 was applied to plain paper using a Hewlett Packard HP 660C ink jet printer, giving prints which were bright magenta in shade.

The optical density of the resulting prints was 1.2 to 1.3, as measured using an X-Rite densitometer.

The prints exhibited an excellent light fastness. After 64 hours exposure in an Atlas Weatherometer the optical density of the prints had only reduced by 10%.

EXAMPLE 2

Dye (2)

Dye (2)

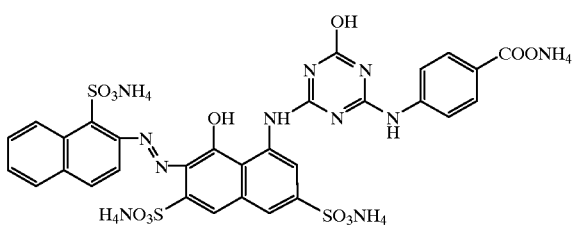

Dye (2) was prepared as described in Example 1, except that the 2-aminobenzenesulphonic acid used in stage (ii) was replaced with 4-amino benzoic acid.

Ink

Ink (2) was prepared by dissolving 2 parts of Dye (2) in 98 parts of a mixture comprising 90 parts water and 10 parts 2-pyrrolidone. The pH of the ink was 7.0.

Ink Jet Printing

Ink (2) was applied to plain paper using an ink jet printer as described in Example 1 giving prints which were bright magenta in shade. The optical density and light fastness of the prints was measured as described in Example 1.

The prints exhibited an excellent light fastness.

EXAMPLE 3
Dye (3)

Dye (3)

[Chemical structure of Dye (3)]

Dye (3) was prepared as described in Example 1, except that the 2-aminobenzenesulphonic acid used in stage (ii) was replaced with 2-amino-5-sulpho benzoic acid.

Ink

Ink (3) was prepared by dissolving 2 parts of Dye (3) in 98 parts of a mixture comprising 90 parts water and 10 parts 2-pyrrolidone. The pH of the ink was 7.0.

Ink Jet Printing

Ink (3) was applied to plain paper using an ink jet printer as described in Example 1 giving prints which were bright magenta in shade. The optical density and light fastness of the prints was measured as described in Example 1.

The prints exhibited an excellent light fastness.

EXAMPLE 4
Dye (4)

Dye (4) was prepared as described in Example 1, except that the 2-aminobenzenesulphonic acid used in stage (ii) was replaced with 3-amino-2-methylbenzoic acid.

Ink

Ink (4) was prepared by dissolving 2 parts of Dye (4) in 98 parts of a mixture comprising 90 parts water and 10 parts 2-pyrrolidone. The pH of the ink was 7.0.

Ink Jet Printing

Ink (4) was applied to plain paper using an ink jet printer as described in Example 1 giving prints which were bright magenta in shade. The optical density and light fastness of the prints was measured as described in Example 1.

The prints exhibited an excellent light fastness.

EXAMPLE 5
Dye (5)

Dye (5)

[Chemical structure of Dye (5)]

Dye (5) was prepared as described in Example 1, except that the 2-aminobenzenesulphonic acid used in stage (ii) was replaced with 5-amino-2-methylbenzenesulphonic acid.

Ink

Ink (5) was prepared by dissolving 2 parts of Dye (5) in 98 parts of a mixture comprising 90 parts water and 10 parts 2-pyrrolidone. The pH of the ink was 7.0.

Ink Jet Printing

Ink (5) was applied to plain paper using an ink jet printer as described in Example 1 giving prints which were bright magenta in shade. The optical density and light fastness of the prints was measured as described in Example 1.

The prints exhibited an excellent light fastness.

Dye (4)

[Chemical structure of Dye (4)]

EXAMPLE 6

Dye (6)

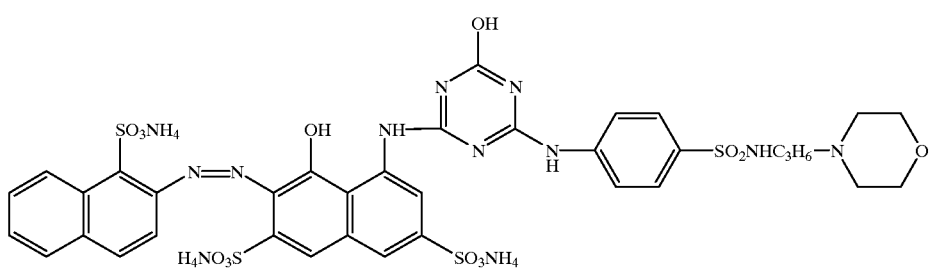

Dye (6)

Dye (6) was prepared as described in Example 1, except that that 2-aminobenzene sulphonic acid used in stage (ii) was replaced with Intermediate (1) of the formula:

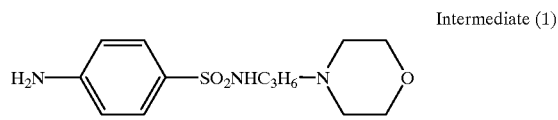

Intermediate (1)

Intermediate (1) was prepared as follows:

N-Acetylsulfanilyl chloride (116.5 g, 0.5 mole) was stirred in water (300 ml). To this was added 4-(3-aminopropyl)morpholine (108.15 g, 0.75 mole) dropwise over approx. 30 minutes. The reaction mixture was then stirred for 12 hours at room temperature. Concentrated HCl (100 ml) was then added and the solution heated to 70° C. for 5 hours. The pH was then raised to 7 by the addition of concentrated NaOH and the solution salted to 20% with NaCl. The resulting precipitate was filtered off, washed and dried to leave the title product. Strength estimated at 81.5%.

Ink

Ink (6) was prepared by dissolving 2 parts of Dye (6) in 98 parts of a mixture comprising 90 parts water and 10 parts 2-pyrrolidone The pH of the ink was 7.0.

Ink Jet Printing

Ink (6) was applied to plain paper using an ink jet printer as described in Example 1 giving prints which were bright magenta in shade. The optical density and light fastness; of the prints was measured as described in Example 1.

The prints exhibited an excellent light fastness.

EXAMPLE 7

Dye (7)

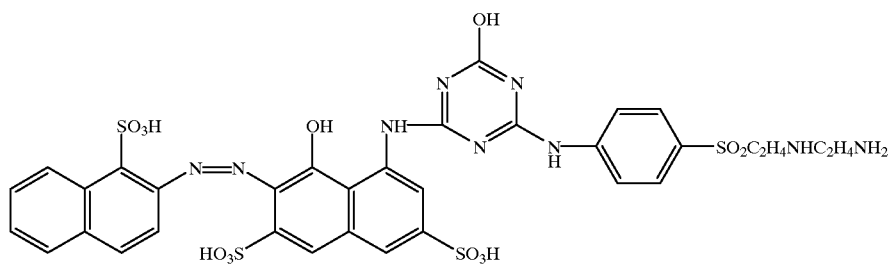

Dye (7)

Dye (7) was prepared as described in Example 1, except that the 2-aminobenzene sulphonic acid used in stage (ii) was replaced with Intermediate (2) of the formula:

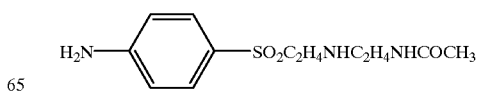

Intermediate (2)

Intermediate (2) was prepared as follows:

p-Aminobenzenesulphatoethylsulphone (0.14 mole, 39.34 g) and N-acetylethylenediamine (0.42 mole, 47.7 g) were added to water. The resulting mixture was heated to 60 degrees for 4 hours, whilst maintaining the pH at 8.5 by addition of aqueous sodium hydroxide solution. Water was then removed from the mixture by distillation to yield a brown oil which crystallised on standing. The crystalline solid was slurried in a small amount of water, isolated by filtration, washed with ethanol and pulled dry to leave the title product (Yield=22.21 g)

Ink

Ink (7) was prepared by dissolving 2 parts of Dye (7) in 98 parts of a mixture comprising 90 parts water and 10 parts 2-pyrrolidone. The pH of the ink was 7.0.

Ink Jet Printing

Ink (7) was applied to plain paper using an ink jet printer as described in Example 1 giving prints which were bright magenta in shade. The optical density and light fastness of the prints was measured as described in Example 1.

The prints exhibited an excellent light fastness.

EXAMPLE 8

The inks described in Tables I and II may be prepared wherein the Dye described in the first column is the Dye made in the above Example of the same number. Numbers quoted in the second column onwards refer to the number of parts of the relevant ingredient and all parts are by weight. The inks may be applied to paper by thermal or piezo ink jet printing.

The following abbreviations are used in Table I and II:

| | |
|---|---|
| PG = propylene glycol | DEG = diethylene glycol |
| NMP = N-methyl pyrrolidone | DMK = dimethylketone |
| IPA = isopropanol | MEOH = methanol |
| 2P = 2-pyrollidone | MIBK = methylisobutyl ketone |
| P12 = propane-1,2-diol | BDL = butane-2,3-diol |
| CET = cetyl ammonium bromide | PHO = $Na_2HPO_4$ and |
| TBT = tertiary butanol | TDG = 1,3-bis(2-hydroxyethyl) urea |

TABLE I

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 4.8 | | 0.2 | | | | | |
| 3 | 10.0 | 85 | 3 | | 3 | 3 | | | | 5 | 1 | |
| 5 | 2.1 | 91 | | 8 | | | | | | | | 1 |
| 2 | 3.1 | 86 | 4.8 | | | | | 0.2 | 4 | | | 5 |
| 1 | 1.1 | 81 | | | 9 | | 0.5 | 0.5 | | | 9 | |
| 7 | 2.5 | 60 | 4 | 15 | 3 | 3 | | | 6 | | 5 | 4 |
| 6 | 5 | 65 | | 20 | | | | | 10 | | | |
| 4 | 2.4 | 75 | 5 | 4 | | 5 | | | | 6 | | 5 |
| 6 | 4.1 | 80 | 3 | 5 | 2 | 9.7 | | 0.3 | | | | |
| 7 | 3.2 | 65 | | 5 | 4 | 6 | | | 5 | 4 | 6 | 5 |
| 3 | 5.1 | 96 | | | | | | | | 4 | | |
| 1 | 10.8 | 90 | 5 | | | | | | 5 | | | |
| 2 | 10.0 | 80 | 2 | 6 | 2 | 5 | | | 1 | | 4 | |
| 4 | 1.8 | 80 | | 5 | | | | | | | 15 | |
| 3 | 2.6 | 84 | | | 11 | | | | | | 5 | |
| 3 | 3.3 | 80 | 2 | | | 10 | | | | 2 | | 6 |
| 2 | 12.0 | 90 | | | | 6.7 | 0.3 | | 3 | | | |
| 5 | 5.4 | 69 | 2 | 20 | 2 | 1 | | | | | 3 | 3 |
| 4 | 6.0 | 91 | | | 4 | | | | | | 5 | |

TABLE II

| Dye | Dye Content | Water | PG | DEG | NMP | CET | TBT | TDG | BDL | PHO | 2P | PI2 |
|---|---|---|---|---|---|---|---|---|---|---|---|---|
| 5 | 3.0 | 80 | 15 | | | 0.2 | | | | | 4.8 | |
| 6 | 9.0 | 90 | | 5 | | | | | | 1.2 | | 3.8 |
| 5 | 1.5 | 85 | 5 | 5 | | 0.15 | 4.65 | 0.2 | | | | |
| 7 | 2.5 | 90 | | 6 | 3.88 | | | | | 0.12 | | |
| 1 | 3.1 | 82 | 4 | 7.7 | | 0.3 | | | | | | 6 |
| 2 | 0.9 | 85 | | 10 | | | | | 4.8 | 0.2 | | |
| 3 | 8.0 | 90 | | 5 | 4.7 | | | 0.3 | | | | |
| 4 | 4.0 | 70 | | 10 | 4 | | | | 1 | | 4 | 11 |
| 5 | 2.2 | 75 | 4 | 10 | 3 | | | | 2 | | 6 | |
| 7 | 10.0 | 91 | | | 6 | | | | | | 3 | |
| 2 | 9.0 | 76 | | 9 | 7 | | 3.0 | | | 0.95 | 4.05 | |
| 4 | 5.0 | 78 | 5 | 11 | | | | | | | 6 | |
| 1 | 5.4 | 86 | | | 7 | | | | | | 7 | |
| 2 | 2.1 | 70 | 5 | 5 | 5 | 0.1 | 0.2 | 4.6 | 5 | 0.1 | 5 | |
| 7 | 2.0 | 90 | | | 10 | | | | | | | |

TABLE II-continued

| Dye | Dye Content | Water | PG | DEG | NMP | CET | TBT | TDG | BDL | PHO | 2P | PI2 |
|---|---|---|---|---|---|---|---|---|---|---|---|---|
| 6 | 2 | 88 | | | 2 | | | 10 | | | | |
| 3 | 5 | 78 | | | 5 | | | 12 | | | 5 | |
| 5 | 8 | 70 | 2 | | 8 | | | 15 | | | 5 | |
| 2 | 10 | 80 | | | | | | 8 | | | 12 | |
| 1 | 10 | 80 | | 10 | | | | | | | | |

What is claimed is:

1. A compound of Formula (1)

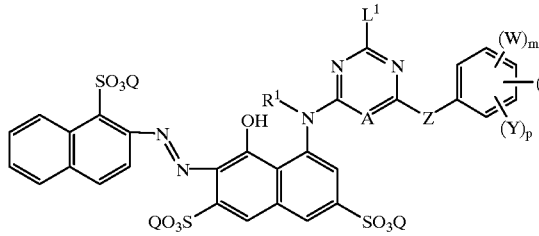

Formula (1)

wherein:

A is N, C—Cl, C—CN or C—NO$_2$;

L$^1$ is —OR$^3$;

Z is —O—, —S— or —NR$^2$—;

R$^1$ and R$^2$ are each independently H or optionally substituted alkyl;

R$^3$ is H or alkyl;

each W independently is —CO$_2$Q or —SO$_3$Q;

each X independently is an optionally substituted amino group or a group which is substituted by an optionally substituted amino group;

each Y independently is halo, hydroxy, nitro, cyano, optionally substituted alkyl, optionally substituted alkoxy, optionally substituted aryl, optionally substituted aralkyl, —SR$^a$, —COR$^a$, —COOR$^a$, —SO$_3$R$^a$ or —SOR$^a$;

R$^a$ is C$_{1-4}$-alkyl optionally substituted by carboxy, sulpho, hydroxy, nitro, cyano or halo;

each Q independently is ammonium or substituted ammonium;

m, n and p each independently have a value of from 0 to 3; and (m+n+p) has a value of from 0 to 5.

2. A compound according to claim 1 wherein each Y independently is halo, hydroxy, nitro, cyano, C$_{1-4}$-alkyl; C$_{1-4}$-alkoxy, —SR$^a$, —COR$^a$, —COOR$^a$, —SO$_3$R or —SOR$_a$, wherein R$_a$ is optionally substituted C$_{1-4}$-alkyl, wherein the optional substituents are selected from the group consisting of carboxy, sulpho, hydroxy, nitro, cyano and halo.

3. A compound according to any one of the preceding claims wherein the optionally substituted amino groups referred to in the definition of X are of the formula —NR$^4$R$^5$ wherein R$^4$ and R$^5$ are each independently H or optionally substituted alkyl; or R$^4$ and R$^5$ together with the nitrogen atom to which they are attached form a 5- or 6-membered ring.

4. A compound according to any one of the preceding claims wherein:

A is N;

m is 0, 1 or 2;

n is 0 or 1;

p is 0 or 1;

X is of the formula —NR$^4$R$^5$ or a group which is substituted by —NR$^4$R$^5$;

Y is halo, hydroxy, cyano, C$_{1-4}$-alkyl, C$_{1-4}$-alkoxy, —SR$^a$, —COR$^a$, —COOR$^a$, —SO$_3$R$^a$ or —SOR$^a$;

R$^4$ and R$^5$ are each independently H or optionally substituted alkyl, or R$^4$ and R$^5$ together with the nitrogen atom to which they are attaches form a 5- or 6-membered ring; and Ra is optionally substituted C1-4-alkyl wherein the optional substituents are selected from the group consisting of carboxy, sulpho, hydroxy, nitro, cyans and halo.

5. A compound according to any one of the preceding claims of the Formula (3):

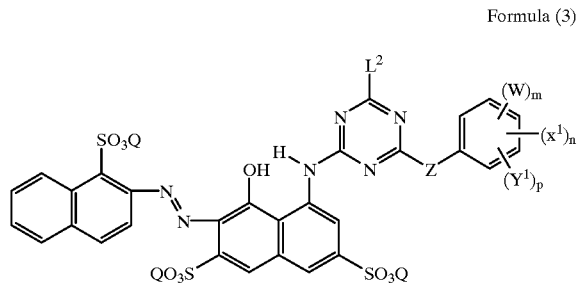

Formula (3)

wherein:

Z is —O—, —S— or —NR$^8$—;

R$^8$ is H or C$_{1-4}$-alkyl optionally substituted by hydroxy, carboxy, sulpho or cyano;

L$^2$ is —OR$^9$;

R$^9$ is H or C$_{1-4}$-alkyl;

each W independently is —CO$_2$Q or —SO$_3$Q—, each X$^1$ is —NR$^4$R$^5$, —SO$_2$—NR$^4$R$^5$, SO$_2$ (C$_{1-10}$-alkylene)-NR$^4$R$^5$ or C$_{1-6}$-alkyl substituted by —NR$^4$R$^5$;

each Y$^1$ independently is Cl, nitro, cyano, C$_{1-10}$-alkyl, or C$_{1-10}$-alkyl substituted by hydroxy, carboxy, sulpho or C$_{1-6}$-alkoxy;

Q is ammonium or substituted ammonium;

m, n and p are each independently 0 or 1;

(m+n+p) is 1, 2 or 3; and

R$^4$ and R$^5$ are each independently H or optionally substituted alkyl or R$^4$ and R$^5$ together with the nitrogen atom to which they are attached form a 5- or 6-membered ring; provided that n is 1 when m is 0.

6. A compound according to claim 4 or 5 wherein —$NR^4R^5$ is of the Formula (2):

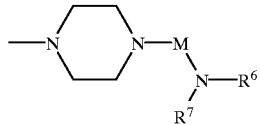

Formula (2)

wherein:
M is an alkylene linking group; and
$R^6$ and $R^7$ are each independently H, $C_{1-6}$-alkyl or $C_{1-6}$-alkyl substituted by hydroxy, carboxy, sulpho, amino or $C_{1-4}$-alkoxy.

7. An ink comprising:
(a) from 0.01 to 30 parts of a compound according to any one of claims 1 to 6 except that Q is any cation; and
(b) from 70 to 99.99 parts of a medium comprising component (i), (ii) or (iii):
   (i) a mixture of water and an organic solvent;
   (ii) an organic solvent free from water; or
   (iii) a low melting point solid;
wherein all parts are by weight and the number of parts of (a)+(b)=100.

8. An ink according to claim 7 wherein Q is sodium, ammonium or substituted ammonium.

9. A process for printing an image on a substrate comprising applying an ink according claim 7 or 8 to the substrate by means of an ink jet printer.

10. A paper, an overhead projector slide or a textile material printed with an ink according to claim 7 or 8 or by means of a process according to claim 9.

11. An ink jet printer cartridge containing an ink according to claims 7 or 8.

* * * * *